United States Patent
Roth et al.

(10) Patent No.: US 11,926,879 B2
(45) Date of Patent: Mar. 12, 2024

(54) METHOD AND INSTALLATION FOR REMOVING SLAG FROM METALLURGICAL MELTS

(71) Applicant: RIA Cast House Engineering GmbH, Leipzig (DE)

(72) Inventors: David Roth, Downingtown, PA (US); Gerald Rockstroh, Leipzig (DE); Michael Rockstroh, Leipzig (DE)

(73) Assignee: RIA Cast House Enginering GmbH, Leipzig (DE)

( * ) Notice: Subject to any disclaimer, the term of this patent is extended or adjusted under 35 U.S.C. 154(b) by 288 days.

(21) Appl. No.: 17/436,643

(22) PCT Filed: Mar. 5, 2020

(86) PCT No.: PCT/EP2020/055868
§ 371 (c)(1),
(2) Date: Sep. 6, 2021

(87) PCT Pub. No.: WO2020/182616
PCT Pub. Date: Sep. 17, 2020

(65) Prior Publication Data
US 2022/0127688 A1    Apr. 28, 2022

(30) Foreign Application Priority Data

Mar. 8, 2019   (DE) ............... 10 2019 106 014.1
Mar. 8, 2019   (DE) ............... 10 2019 106 016.8

(51) Int. Cl.
*C21B 3/04*  (2006.01)
*B22D 43/00* (2006.01)
*C22B 9/16*  (2006.01)
*C22B 21/00* (2006.01)
*F27D 3/15*  (2006.01)

(52) U.S. Cl.
CPC .............. *C21B 3/04* (2013.01); *B22D 43/007* (2013.01); *C22B 9/16* (2013.01); *C22B 21/0092* (2013.01); *F27D 3/1563* (2013.01)

(58) Field of Classification Search
CPC ..... B22D 43/007; C21B 3/04; C22B 21/0092; C22B 9/16; F27D 3/1545; F27D 3/1563; F27D 3/1554
USPC .................. 266/44, 227, 228, 205, 200, 201
See application file for complete search history.

(56) References Cited

U.S. PATENT DOCUMENTS

| | | | | |
|---|---|---|---|---|
| 3,883,124 A | * | 5/1975 | Galer .............. | B22D 43/007 266/228 |
| 4,057,232 A | * | 11/1977 | Ross .............. | C22B 19/00 266/227 |
| 5,051,180 A | * | 9/1991 | Williams .......... | F27D 3/1563 414/718 |

(Continued)

FOREIGN PATENT DOCUMENTS

| | | |
|---|---|---|
| DE | 3928671 C2 | 5/1996 |
| DE | 19729702 A1 | 1/1999 |

(Continued)

*Primary Examiner* — Scott R Kastler
*Assistant Examiner* — Michael Aboagye
(74) *Attorney, Agent, or Firm* — Smartpat PLC

(57) ABSTRACT

A method and an installation (10) for removing slag allows both slag removal and metal recovery from slag (60') to be performed quickly and easily. The risk of slag fires is reduced.

10 Claims, 6 Drawing Sheets

(56) References Cited

U.S. PATENT DOCUMENTS

| | | | |
|---|---|---|---|
| 7,157,042 B2* | 1/2007 | Roth | C21B 3/06 266/205 |
| 10,151,534 B2* | 12/2018 | Epps | F27D 3/1563 |
| 11,519,043 B2* | 12/2022 | Li | F27D 3/15 |

FOREIGN PATENT DOCUMENTS

| | | |
|---|---|---|
| EP | 0922515 A1 | 6/1999 |
| JP | H07197141 A | 8/1995 |

\* cited by examiner

METHOD AND INSTALLATION FOR REMOVING SLAG FROM METALLURGICAL MELTS

CROSS-REFERENCE TO RELATED APPLICATION

This application is a national stage application, filed under 35 U.S.C. § 371, of International Patent Application No. PCT/EP2020/055868, filed on 2020 Mar. 5, which claims the benefit of German Patent Applications Nos. 10 2019 106 014.1, filed 2019 Mar. 8, and 10 2019 106 016.8, filed 2019 Mar. 8.

TECHNICAL FIELD

The present disclosure relates to a method for removing slag from metallurgical melts and to an installation for removing slag from metallurgical melts.

BACKGROUND

Metallurgical melts are produced to obtain metals or alloys with the highest possible purity. Both raw materials and recycled materials can be used. Such metallurgical melts are produced, for example, in melting or casting furnaces, but also in pans.

When metals are smelted from their ores, as well as when metals or their alloys are smelted under atmospheric or technological influence, slags are formed, which, depending on the smelting technique and the starting material, may also be dross, residues, ash or, in the case of greater oxygen-induced oxidation, melting loss. In addition to oxidic products, such slags may also contain impurities primarily adhering to the melt material or reaction products caused by the process.

Therefore, such slags must be removed from melts before they can be further used, that is, they must be "deslagged" (also known as "skimmed" or "de-ashed"). The problem is that, although such slags are of lower density and therefore float on the melt, they have a higher melting point than the melt itself, which is why the slag lying on top of the melt is usually highly viscous, which promotes the inclusion of melt constituents in the slag. As a result, the formation of slag is always accompanied by a loss of melt.

There are several methods for removing the slag from the melt.

DE 39 28 671 C2 describes a method with which a melting furnace has a barrier for slag and the slag is periodically drawn off by means of a slag pusher and with the tilting of the entire furnace, causing the melt to separate from the slag. As an alternative to the slag pusher and tipping, a floating lifting device can be used in conjunction with a slag pallet, in order to automatically transfer the slag into a slag container (also called a "bucket") when the furnace door is opened. To collect the slag behind the barrier, an electromagnetic stirrer is used in each case to generate a flow. However, this can only be used to operate small melting furnaces.

DE 197 29 702 A1 describes a method for large melting furnaces, with which the slag floating on the melt is drawn off from the melt by means of a device for extracting the slag in the form of a draw-off blade, which is arranged on a long movable arm, and transferred to a slag container on the charging side of the melting furnace via the sill of the melting furnace. Subsequently, an attempt is made to recover at least part of the melt bound in the slag.

In the case of molten aluminum production, the situation is as follows:

Aluminum is one of the most important raw materials for innovative industries such as aerospace and vehicle manufacturing. The basic principle of production from the aluminum ore bauxite has not changed since the end of the 19th century. By means of electrolysis, it is obtained according to the so-called "Hall Héroult process" at 960° C. The extraction of aluminum from ore has major disadvantages, since problematic residual materials such as red mud are produced. Furthermore, the production of aluminum is highly energy-intensive. Recycled aluminum, on the other hand, requires only 5% of the energy used in its production compared to extraction from ore. In addition, hardly any toxic residues are produced in the process.

The aluminum to be recycled is melted down in smelting furnaces and cast into various semi-finished products. When aluminum is melted down, impurities, localized overheating and the oxide layer on the starting material cause metal losses—aluminum dross. In Germany alone, this results in approximately 40,000 tons of metal losses per year. Aluminum dross consists mainly of aluminum oxide and aluminum. The metal content of aluminum dross amounts to 50-70%. The aluminum is bound in the Al2O3 framework as in a sponge.

The aluminum dross floats on the molten pool. At this point, the aluminum dross has an insulating effect and prevents further heat input into the molten pool. Furthermore, aluminum dross, when sufficient oxygen is available, tends to burn. Thus, for the above reasons, it is necessary to skim the aluminum dross and remove it from the molten pool. Skimming machines are typically used for skimming. The skimming machine is positioned in front of the opened melting furnace and a movable arm with a blade moves into the melting furnace. The blade is lightly dipped into the molten pool and the aluminum dross is successively pulled in the direction of the furnace opening and initially deposited on the furnace barrier ("sill"). The goal of depositing is to have some of the molten aluminum flow back into the melting furnace. Subsequently, the aluminum dross is pulled into buckets in front of the melting furnace.

There are different methods for the further processing of aluminum dross. All methods have the objective of suppressing dross fires by rapid cooling, and thus preserving the metal content in the aluminum dross.

The most common method is dross pressing by means of a separate press. During dross pressing, the aluminum dross located in the bucket is compressed by a hydraulic press ram. In addition to the effect of cooling, the solidifying aluminum gathers into smaller plates. In further processing steps, the aluminum is mechanically separated from the aluminum oxide and can be remelted, such that up to 60% of the dross can be returned to the production cycle as aluminum.

In the style of dross pressing, matching cast iron lids are placed on dross pans. The objective of this is to cool the aluminum dross through the heat capacity of the lid and to stop possible fires by cutting off the oxygen supply. Further processing of the cold aluminum dross is analogous to dross pressing.

An additional method for treating aluminum dross is inert gas cooling. To do this, the dross pan is placed in a sealable chamber and cooled by the addition of inert gas, and dross fires are smothered. Further processing is analogous to dross pressing.

All of these methods prevent dross fires and help recover aluminum from aluminum dross, but they require complex specialized equipment and are highly time-intensive.

SUMMARY

It is an object of the present disclosure to provide a method of recovering metals from slag in the production of metallurgical melts that is less costly and less time-consuming than known methods. In particular, it should enable aluminum dross to be treated more quickly and cost-effectively.

This object is achieved with a method for removing slag and an installation for removing slag as described herein. Although there are various terms, within the framework of the present disclosure, the terms "slag" or "removing slag" and "melting furnace" should be used uniformly within the framework of the present disclosure.

On the part of the inventor, it was recognized that the object set can be achieved in a surprisingly simple manner if the slag is pressed before it is transferred to a slag container, because at that point the slag has not yet cooled down and can be pressed better. This makes the pressing process less time-consuming. In addition, metal pressed from the slag can thus flow directly back into the melt of the melting furnace, which can significantly reduce working time. In addition, the slag cools down already during the pressing process, such that slag fires can be effectively prevented as a result.

The method for removing slag from metallurgical melts, whereby the slag is drawn off from the melt, is thus characterized by the fact that the slag is pressed before being transferred to a slag container.

In an advantageous further development, it is provided that the slag is pressed in the furnace by means of an extractor device used for extracting the slag. The method is then particularly easy to carry out, because a separate pressing device located outside the furnace is not required. The phrase "in the furnace" also includes external areas of the furnace, such as a furnace sill.

In an advantageous further development, it is provided that the slag is pressed between the extractor device and a counter-bearing. At that point, the pressing process is particularly easy to implement in terms of design.

In an advantageous further development, it is provided that molten material emerging from the slag during pressing is fed to the melt. This significantly reduces the working time, because there is no need to re-charge the recovered metal.

In an advantageous further development, it is provided that the slag rests on a sill of a melting furnace during pressing out, wherein the pressing process is preferably started immediately after the slag has been drawn off onto the sill. This allows the recovered metal to be fed into the melt and, at the same time, the sill prevents the reintroduction of drawn-off slag into the melt.

The installation in accordance with the disclosure for removing slag from metallurgical melts is adapted to withdraw slag from the melt. The installation comprises means for extracting the slag from the melt. The installation further comprises means for pressing that are adapted to press the slag before transferring it into a slag container.

In an advantageous further development, it is provided that the means for pressing have, at least on one of the surfaces that press the slag between them, a surface structure, preferably with elevations and depressions, most preferably with a waffle iron shape, in particular with parallel trenches and valleys and/or with elevations and depressions arranged in the manner of a checkerboard and/or with intersecting webs and/or with intersecting grooves. This surface structure generates local pressure peaks, which improve the pressing process and thus the pressing out of the metal from the slag.

In an advantageous further development, it is provided that the installation is adapted to carry out the method in accordance with the disclosure.

In an advantageous further development, it is provided that the means for extracting are part of the means for pressing. This makes the installation particularly simple.

In an advantageous further development, it is provided that the means for extracting comprise a draw-off blade to which a counter-blade is assigned, such that the slag can be pressed out between the draw-off blade and the counter-blade. This makes the pressing-out process particularly easy and fast.

In an advantageous further development, it is provided that the draw-off blade and the counter-blade each have lower edges. The lower edge of the draw-off blade is arranged at the same height as or above the lower edge of the counter-blade during pressing, such that molten material emerging from the slag is discharged under the draw-off blade. This makes it particularly easy to return the melted material to the melt. Since the furnace sill usually has a slight slope (2°-3°), the arrangement at the same height also allows the molten material to flow off.

In an advantageous further development, it is provided that the means for pressing have, at least on one of the surfaces pressing the slag between them, one or more guides for diverting the molten material emerging from the slag, wherein the guides are preferably in the form of perforations in the surface, wherein the guides are arranged, in particular, in the draw-off blade. This also makes it particularly easy to return the melted material to the melt.

In an advantageous further development, the draw-off blade and/or the counter-blade are formed to be able to be cooled. This allows such blades to be cooled during the pressing and ejection of the slag, by which the adhesion of the slag to the blades is reduced and the detachability of the slag is improved. Corresponding means for cooling can be electrically activatable, for example with the aid of a Peltier element, or can be formed with a refrigerant circuit of the usual type and manner with a corresponding refrigerant fluid.

In an advantageous further development, it is provided that the means for pressing have ejectors for detaching the slag from the means for pressing, wherein the ejectors are preferably formed as plungers, which are arranged in particular on the draw-off blade and/or the counter-blade. As a result, the pressed-out slag is very easily detached again from the means for pressing, such that it can be quickly transferred to slag containers and is not returned to the melt.

In an advantageous further development, it is provided that the installation is formed to be movable relative to a base of the installation. This allows several melting furnaces to be operated one after the other and also allows the charging opening of a melting furnace to be released quickly.

In an advantageous further development, the means for pressing out are formed to be vertically liftable and/or horizontally displaceable. This allows for easy maneuvering with respect to a melting furnace.

The features and further advantages of the present invention will become apparent from the following description of a preferred exemplary embodiment in connection with the figures.

DETAILED DESCRIPTION

Figure 1:
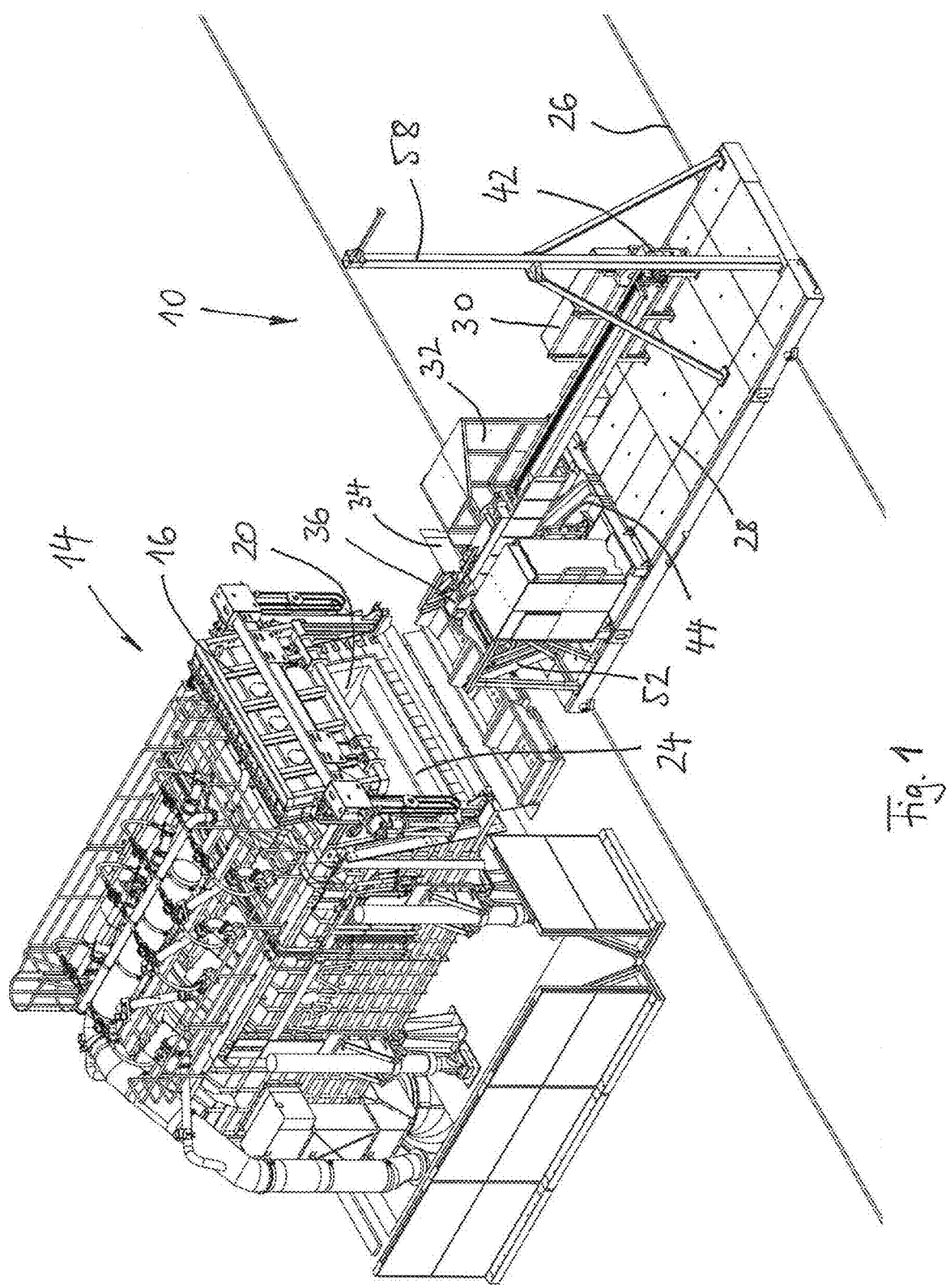
FIG. 1 is a perspective view of an installation for removing slag from metallurgical melts in interaction with a melting furnace.
Figure 2:
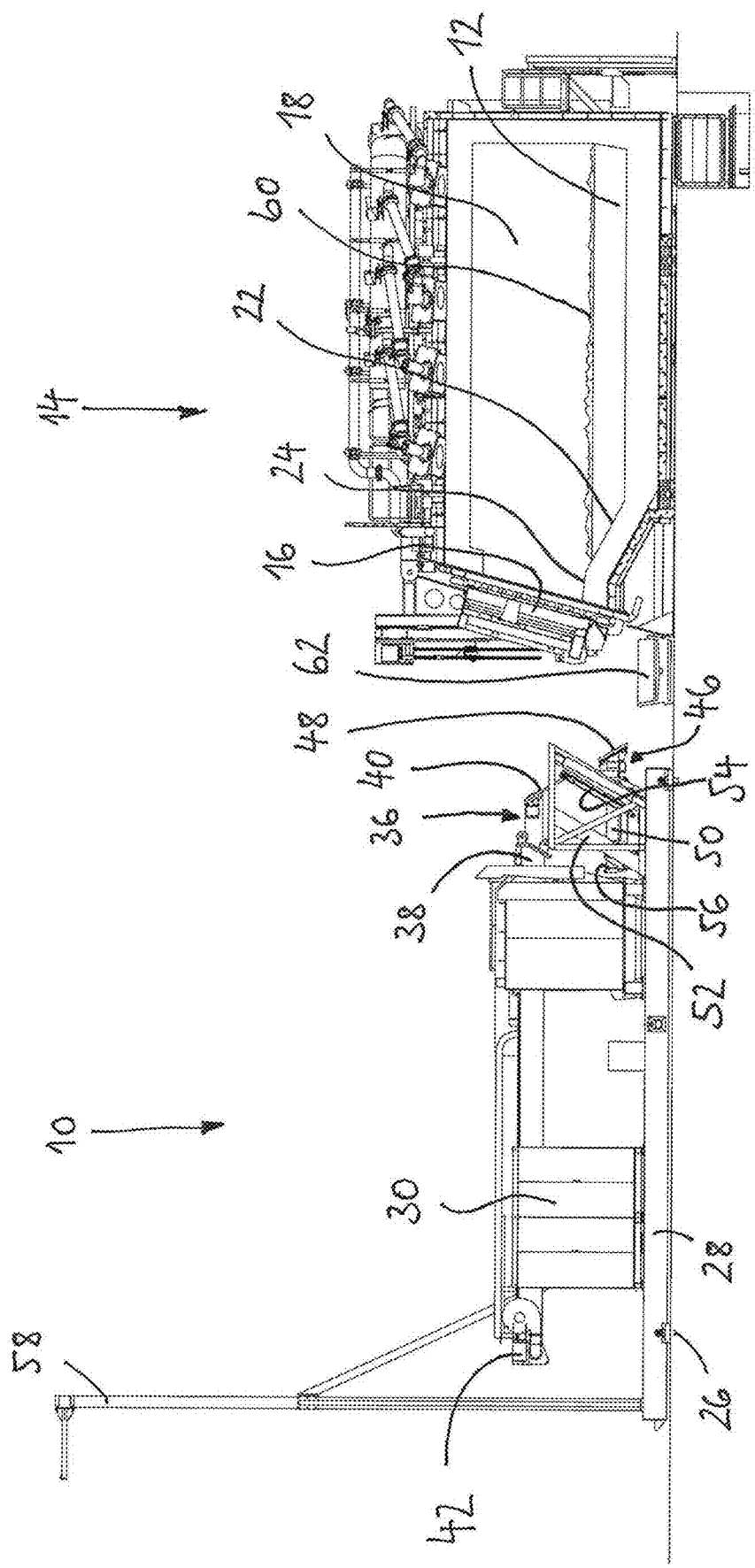
FIG. 2 shows the installation in accordance with FIG. 1 in interaction with the melting furnace in a sectional view in a first operating state (in front of the furnace, furnace closed).
Figure 3:
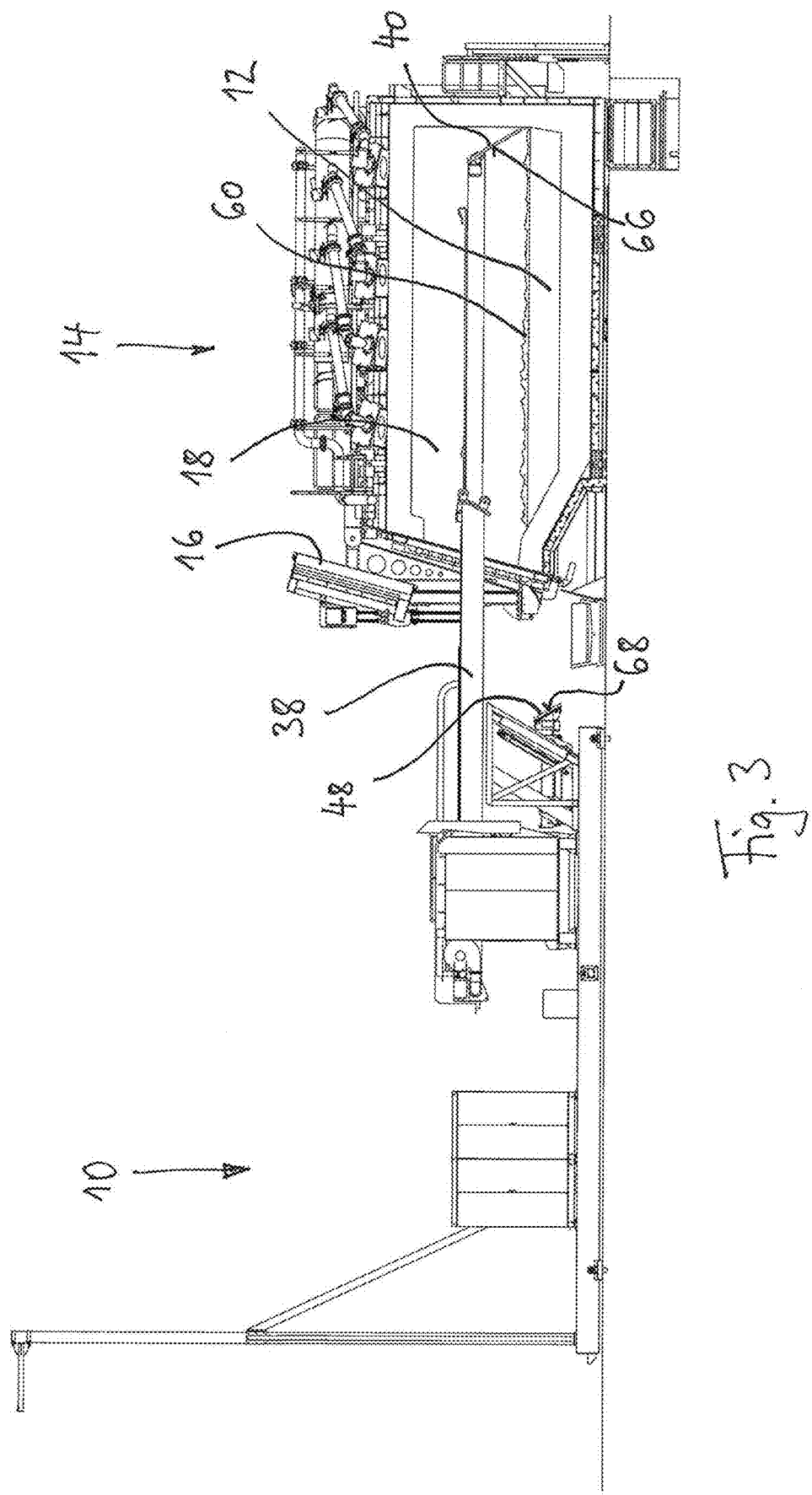
FIG. 3 shows the installation in accordance with FIG. 1 in interaction with the melting furnace in a sectional view in a second operating state (furnace open and draw-off blade maximally inward).

FIGS. 1 to 5 show an installation 10 for removing slag from melts 12. The installation 10 cooperates with a melting furnace 14. The melting furnace 14 is formed as a hearth-type melting furnace and has a melting area 18. The melting area 18 can be closed by a vertically movable furnace door 16 and has a charging opening 20, a furnace ramp 22 and a furnace sill 24.

Thereby, the slag removal unit 10 has a base 28 that can be moved laterally past the melting furnace 14 on rails 26, on which control equipment 30 and an operator station 32 with a heat shield 34 are arranged.

Means 36 for extracting, comprising a telescoping mast or boom 38 and a draw-off blade 40 attached thereto, are further arranged on the base 28. The draw-off blade 40 has perforations (not shown), which completely penetrate the draw-off blade 40; that is, they extend through from the side turned towards the counter-blade 48 to the melting area 18.

First controllable means 42 are provided for driving the extending and retracting motion of the telescopic mast or boom 38. Second controllable means 44 are provided for the vertical displacement of the mast or boom 38. Such means 42, 44 may be formed to be hydraulic means, for example. However, a purely electrical formation is also possible. It is only important that both the depth of penetration of the draw-off blade 40 into the furnace 14 and the vertical height of the draw-off blade 40 above the melt 12 are adjustable.

Furthermore, the draw-off blade 40 is part of the means 46 for pressing, which additionally comprise a counter-blade 48 that is arranged on an additional telescopic arm 50. Such arm 50 is also hydraulically actuated by way of example, wherein the vertical height is provided by a parallelogram guide 52 and hydraulic means 54, and the extension and retraction of the telescopic arm 50 are provided with controllable hydraulic means 56. Here as well, the hydraulic means 54, 56 could also be of purely electrical form. Importantly, both the depth of penetration of the counter-blade 48 into the furnace 14 and the vertical height of the counter-blade 48 above the furnace sill 24 are adjustable.

The draw-off blade 40 and counter-blade 48 are controlled by an operator (not shown) at the operator station 32 in conjunction with control equipment 30, which receives its power from a power supply line (not shown), which is attached to a boom 58 at the base 28, to prevent it from getting caught in the rails 26.

Discharge means 64 are arranged on the side of the furnace sill 24 for discharging the slag 60 into the slag container 62 (bucket) that can be provided.

In addition, means (not shown) for removing adhering slag 60' can be provided in the draw-off blade 40 and/or in the counter-blade 48, which means are formed, for example, as activatable mandrels, plungers or the like. If necessary, they can protrude from the inside of the draw-off blade 40 and/or the counter-blade 48, as the case may be, over the pressing surfaces 66 or 68, as the case may be (see FIG. 3), and thus repel the slag 60'.

Figure 6:
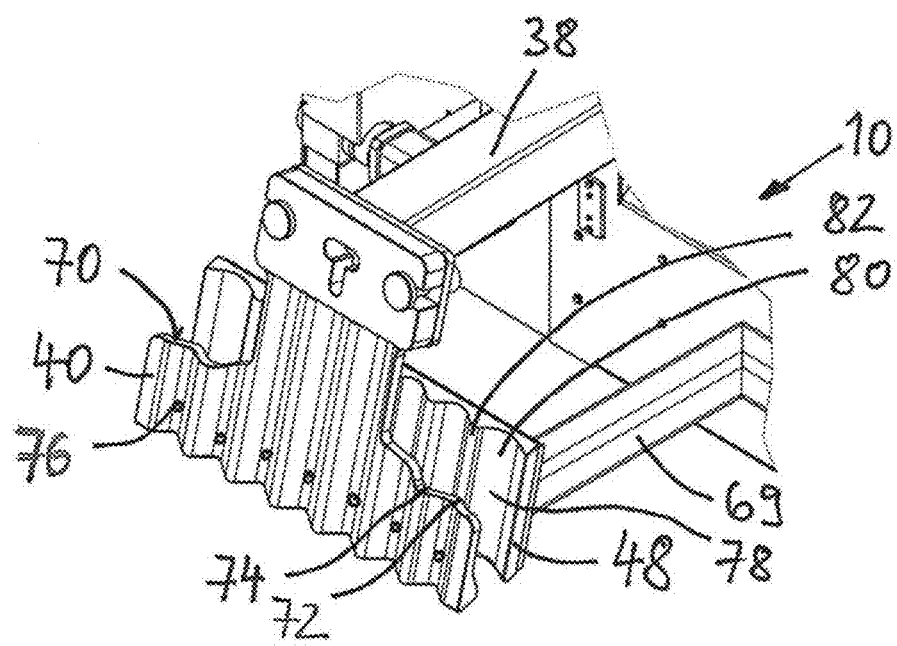
FIG. 6 is a perspective view of the draw-off blade and counter-blade.

In addition, means (not shown) for cooling the draw-off blade 40 and/or the counter-blade 48 may be provided, by which such blades 40, 48 are each formed to be cooled. In the example shown in FIG. 6, only the counter-blade 48 is formed to be air-cooled, wherein cooled compressed air is routed through lines 69 and directed through channels (not shown) in the counter-blade 48. In FIG. 6, to improve clarity, the means 46 for pressing are not shown.

FIG. 6 shows that the pressing surface 66 of the draw-off blade 40 has a surface structure 70 with elevations 72 and depressions 74 arranged in a waffle-like manner. In addition, perforations 76 are provided in the pressing surface 66 to fully penetrate the draw-off blade 40.

The pressing surface 68 of the counter-blade 48 shown in FIG. 6 is provided with a surface structure 78 that is complementary to the surface structure 70 of the draw-off blade 40, such that elevations 72 in the draw-off blade 40 meet depressions 80 in the counter-blade and depressions 74 in the draw-off blade 40 meet elevations 82 in the counter-blade 48. This results in particularly good pressure distribution, with pressure peaks forming locally in the transitions from elevations 72, 82 and depressions 74, 80, which ensure particularly good pressing.

The method in accordance with the disclosure is now carried out as follows.

A charging device, not shown, is used to charge the melting furnace 14 with starting material and to close the furnace door 16. After complete formation of the melt 12, the installation 10 is placed in front of the furnace door 16 by means of the rails 26 and the furnace door 16 is opened (see FIG. 2).

Subsequently, the draw-off blade 40 with the telescopic mast 38 is inserted into the melting area 18 (see FIG. 3) and portions 60' of the slag 60 are pulled over the furnace ramp 22 onto the furnace sill 24 and pressed against the counter-blade 48. Beforehand, the lower edge of the counter-blade 48 is placed on the furnace sill 24 (see FIG. 4).

Alternatively, a large part or the entire melting area 18 of the melting furnace 14 can be cleared of slag 60 first, wherein the slag 60' is deposited on the furnace sill 24, and only then is the pressing out performed.

Due to the pressure during pressing out between the draw-off blade 40 and the counter-blade 48, the molten material contained in the slag 60' emerges and passes through the draw-off blade 40 through the perforations 76, such that it is conveyed back into the melt 12. In addition, molten material in the channels formed by the counterrotating elevations 72, 82 and depressions 74, 80 flows downward in the direction of the furnace sill 24 and from there into melt 12.

Thereby, the counter-blade 48 acts as a barrier, such that neither molten material nor slag 60' can pass out of the melting furnace 14 via the sill 24. In turn, the draw-off blade 40 prevents the slag 60' from returning to the melting area 18.

In addition, the lower edge of the draw-off blade 40 can be raised relative to the furnace sill 24 sufficiently to allow molten metal to flow back into the melt 12 between the draw-off blade 40 and the furnace sill 24, without carrying slag 60' into the melt 12 during pressing. In doing so, the lower edge of the counter-blade 48 rests on the furnace sill 24, in order to effect a seal with respect to the molten material. Due to the slope of the furnace sill 24, it is sufficient for this purpose that the lower edge of the draw-off blade 40 is at the same height as the lower edge of the counter-blade 48.

Figure 4:
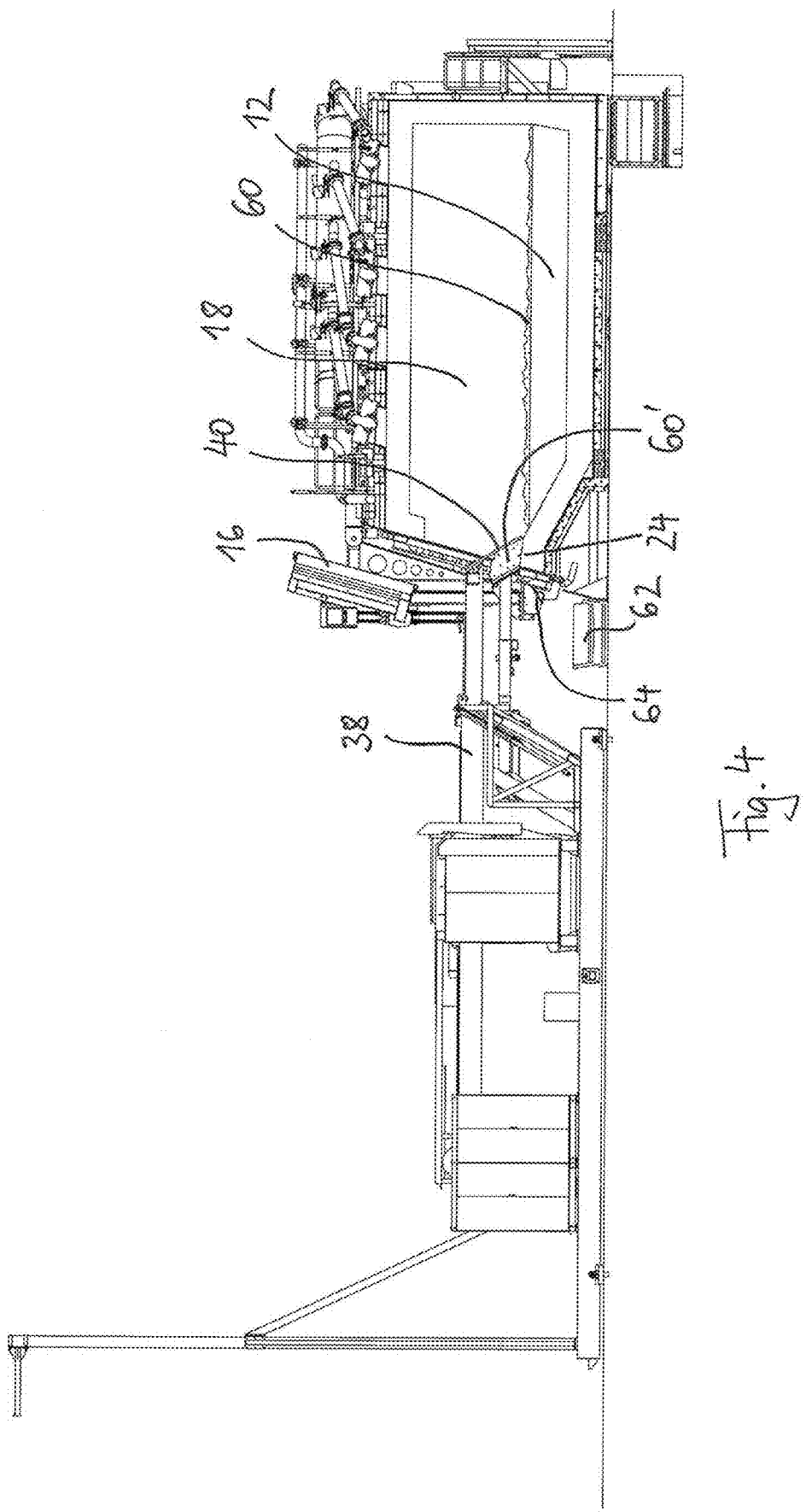
FIG. 4 shows the installation in accordance with FIG. 1 in interaction with the melting furnace in a sectional view in a third operating state (furnace open and draw-off blade and counter-blade pressing slag onto sill)

FIGS. 4 and 6 show that the draw-off blade 40 and the counter-blade 48 are arranged plane-parallel to each other with a downward slope in the direction of the melting area 18, thereby conveying the discharge of liquid metal that is pressed out from the slag 60' into the melt 12.

However, instead of a plane-parallel arrangement, for example, an arrangement could also be selected with which the distance between the draw-off blade 40 and the counter-blade 48 tapers upwards, such that the pressure acts downwards and thus the slag 60' or the molten material, as the case may be, does not emerge upwards.

Figure 5:
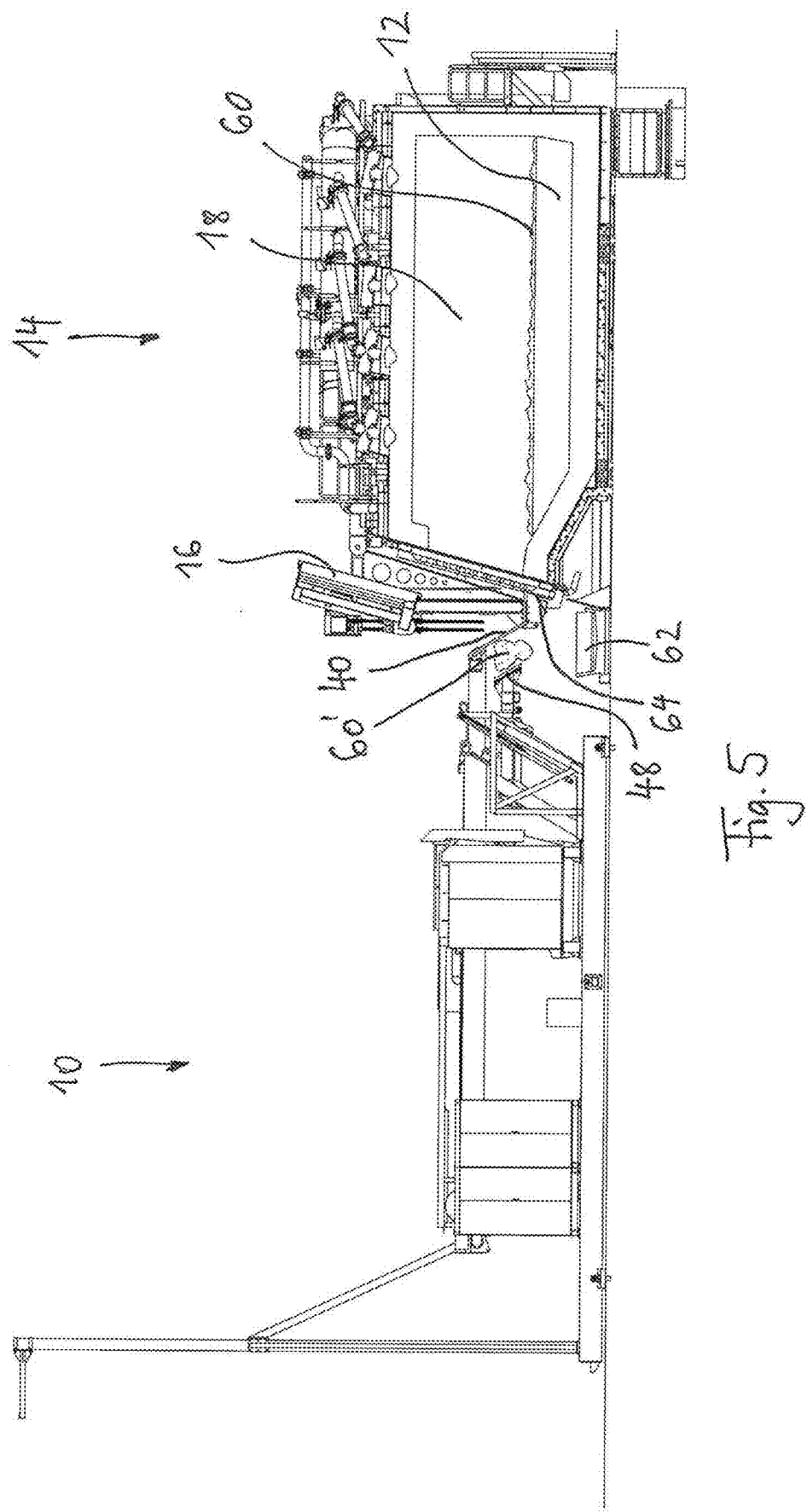
FIG. 5 shows the installation in accordance with FIG. 1 in interaction with the melting furnace in a sectional view in a fourth operating state (furnace open and draw-off blade and counter-blade outside, slag falls into bucket).

The counter-blade 48 is then pulled away from the melting furnace 14 and the pressed-out slag 60' is conveyed by means of the draw-off blade 40 via the discharge means 64 into the slag container 62 (see FIG. 5). In doing so, the means for ejecting the slag 60' in the draw-off blade 40 and counter-blade 48 can be activated to better detach the slag 60' from the blades 40, 48. This detachment can also be promoted by activating the means for cooling the draw-off blade 40 and/or counter-blade 48 at least during ejection, but preferably already during pressing.

Alternatively or additionally, the pressing surfaces 66, 68 could also be provided with a non-stick coating (black wash) for the slag, consisting for example of graphite paste or boron nitride.

Such process is repeated until the melting furnace 14 is completely deslagged, wherein such process takes 15 min to 20 min for typical melting furnaces 14 with a capacity of 35 to 60 tons. In doing so, the amount of work can be reduced by using wider draw-off blades 40 and counter-blades 48, wherein the counter-blade 48 is preferably wider than the draw-off blade 40, such that the draw-off blade 40 can be worked freely against the counter-blade 40, which is firmly supported on the furnace sill 24, without allowing the slag 60' or molten material to escape from the melting furnace 14.

It can be seen that removing slag and pressing can be carried out in a single operation, which considerably reduces the working time and the installation 10 for removing slag nevertheless does not have to be formed to be significantly more complex than previously existing installations, as shown by example in DE 197 29 702 A1.

While the previously known methods only reduce the metal losses after the slag has already left the melting process, here the slag 60 is pressed out even before cooling in the melting furnace 14, by which the initial accumulation of metal losses is already reduced. In doing so, a substantial metal portion of the slag 60 flows back into the melting furnace 14, such that such portion does not have to be processed and remelted. Furthermore, the slag 60 cools down already during the pressing process, and thus further metal losses due to slag fires are reduced.

By such measures, the metal content of the slag 60' can be reduced by approximately 50% by pressing out in the melting furnace 14. Such metal remains in the process.

Advantageously, the means for pressing are designed for a pressing force of 20 kN, or more if necessary, although larger pressing forces can also be used for larger surfaces and counter-surfaces of the draw-off blade 40 and the counter-blade 48.

The materials are to be designed accordingly, wherein a heat-resistant cast steel material, such as is also used for the slag container 54, is preferably used for the draw-off blade 40 and the counter-blade 48. However, welded or forged blades 40, 48 can also be used. The blades 40, 48 may also comprise titanium.

Although the invention has been substantially explained in connection with the production of aluminum from recycled material, the invention is not limited thereto; other metals and alloys may also be processed and ores may also be used for their production.

From the foregoing, it is clear that the present invention provides a method and an installation 10 for removing slag, which allows both slag removal and metal recovery from slag 60 to be performed quickly and easily and reduces the risk of slag fires.

Unless otherwise indicated, all features of the present disclosure may be freely combined. Also, unless otherwise indicated, the features described in the figure description may be freely combined with the other features. A restriction of individual features of the exemplary embodiment to the combination with other features of the exemplary embodiment is explicitly not intended in this context; such individual features can be used independently for combination with other features, in particular features specified in the set of claims. In addition, subject matter features can also be reformulated and used as method features, and method features can be reformulated and used as subject matter features. Thus, such a reformulation is automatically disclosed.

LIST OF REFERENCE SIGNS

10 Installation for removing slag
12 Melt
14 Melting furnace
16 Furnace door
18 Melting area
20 Charging opening
22 Furnace ramp
24 Furnace sill
26 Rails
28 Movable base of the installation 10
30 Control equipment
32 Operator station
34 Heat shield
36 Means for extracting
38 Telescopic mast or boom, as the case may be
40 Draw-off blade
42 First controllable means
44 Second controllable means
46 Means for pressing
48 Counter-blade
50 Telescopic arm
52 Parallelogram guide for arm 50
54 Controllable means 56 Controllable means
58 Boom
60 Slag
60' Portions of slag 60
62 Slag container, bucket
64 Discharge means
66 Pressing surface of the draw-off blade 40
68 Pressing surface of the counter-blade 48
69 Lines for compressed air for cooling
70 Surface structure of the pressing surface 66 of the draw-off blade 40
72 Elevations
74 Depressions
76 Openings in the pressing surface 66
78 Surface structure of the pressing surface 68 of the counter-blade 48
80 Depressions
82 Elevations

The invention claimed is:

1. A method for removing slag from a metallurgical melt (12), comprising: providing a slag removal unit (10) cooperating with a melting furnace (14), comprising: a base (28); a draw-off blade (40) attached to a mast (38) arranged on the base (28), and a counter-blade (48) arranged on the base (28); drawing off the slag (60, 60') from the melt (12) with the draw-off blade (40); moving the counter-blade (48) into a position opposite the draw-off blade (40); pressing the slag (60, 60') between the draw-off blade (40) and the counter-blade (48); and transferring the slag (60, 60') into a slag container (62).

2. The method according to claim 1, further comprising: feeding molten material emerging from the slag (60') during pressing to the melt (12).

3. The method according to claim 1,
wherein drawing off the slag (60, 60') from the melt (12) includes drawing the slag (60') onto a sill (24) of a melting furnace (14), and
wherein pressing the slag is performed after the slag (60') has been drawn off onto the sill (24) and while the slag (60') rests on the sill (24).

4. The method according to claim 1, wherein the mast is a telescoping mast.

5. An installation (10) for removing slag from metallurgical melts (12), wherein the installation (10) is adapted to withdraw slag (60, 60') from the melt (12) in a melting furnace (14), and wherein the installation (10) comprises: a base (28); a draw-off blade (40) arranged on a mast (38) supported on the base (28), for extracting the slag (60,60') from the melt (12); and a counter-blade (48) arranged on an arm (50) supported on the base (28), the counter-blade (48) being movable into a position opposite the draw-off blade (40), wherein the slag (60,60') is pressed out between the draw-off blade (40) and the counter-blade (48) before transferring the slag (60,60) to a slag container (62).

6. The installation (10) according to claim 5,
wherein the draw-off blade (40) and the counter-blade (48) each have lower edges,
wherein the lower edge of the draw-off blade (40) is arranged at a same height as or above the lower edge of the counter-blade (48) during pressing, such that molten material emerging from the slag (60') is discharged under the draw-off blade (40).

7. The installation (10) according to claim 5,
wherein a surface of the draw-off blade (40) comprises
guides for diverting molten material emerging from the slag (60'), and wherein the guides are formed as perforations.

8. The installation (10) according to claim 5,
wherein the draw-off blade (40) and/or the counter-blade (48) are formed to be able to be cooled.

9. The installation according to claim 5, wherein ejectors formed as plungers are arranged on the draw-off blade (40) and/or the counter-blade (48) for detaching the slag (60,60').

10. The installation (10) according to claim 5,
wherein the mast (38) is a telescoping mast, and
wherein the arm (50) is a telescoping arm.

* * * * *